United States Patent [19]
Caprio
[11] 3,886,463
[45] May 27, 1975

[54] PULSE WIDTH DETECTOR CIRCUIT

[75] Inventor: Samuel J. Caprio, Severna Park, Md.

[73] Assignee: The United States of America as represented by the Secretary of the Air Force, Washington, D.C.
[22] Filed: May 9, 1974
[21] Appl. No.: 468,328

[52] U.S. Cl. ................ 329/106; 307/234; 328/112; 329/192
[51] Int. Cl. .............................................. H03k 9/08
[58] Field of Search ............ 328/112; 329/192, 106; 307/234

[56] References Cited
UNITED STATES PATENTS

| | | | |
|---|---|---|---|
| 3,600,688 | 8/1971 | Booth | 307/234 X |
| 3,611,157 | 10/1971 | Hughes | 307/234 X |

*Primary Examiner*—Alfred L. Brody
*Attorney, Agent, or Firm*—George Fine

[57] ABSTRACT

A pulse width detector circuit in which pulse processing reshapes the output pulse of logarithmic amplifier so that the width of the logarithmic amplifier output pulse equals the width of the logarithmic input pulse at any predetermined percentage peak amplitude level of the logarithmic amplifier input pulse.

3 Claims, 1 Drawing Figure

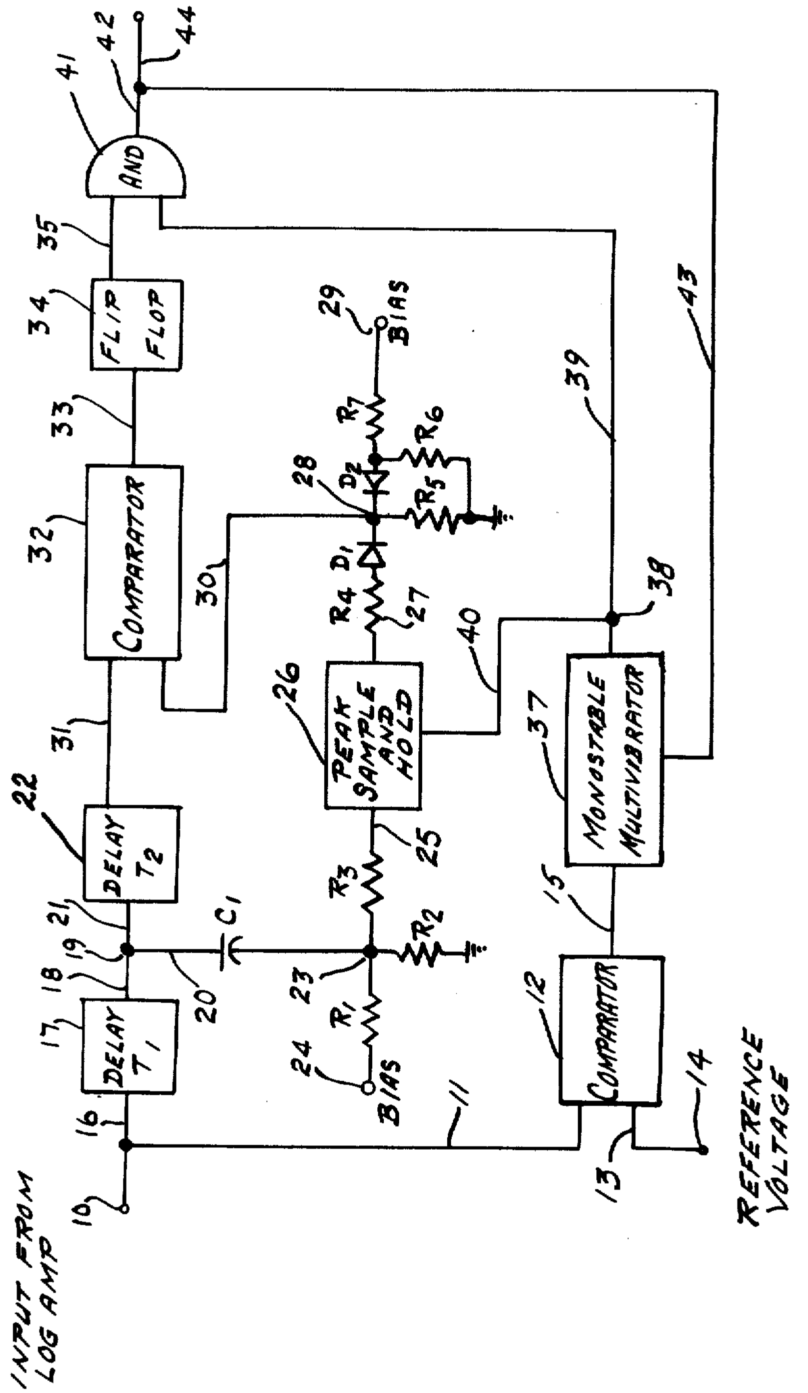
INPUT FROM LOG AMP
DELAY T1
DELAY T2
COMPARATOR
FLIP FLOP
AND
PEAK SAMPLE AND HOLD
BIAS
BIAS
COMPARATOR
MONOSTABLE MULTIVIBRATOR
REFERENCE VOLTAGE

PULSE WIDTH DETECTOR CIRCUIT

BACKGROUND OF THE INVENTION

The purpose of this invention is to process the pulse signal output of a logarithmic amplifier in heterodyne receivers which are used to measure the parameters of RF pulse signals. The desired RF pulse signals may vary as much as 80 db in amplitude from pulse to pulse and by using a logarithmic amplifier, the output amplitude variation is compressed to 20 db. The logarithmic compression is nonlinear and therefore the output waveform is a distorted version of the input waveform. The degree of distortion is a function of input signal level. Because of this distortion, the pulse width of the output pulse is not equal to the pulse width of the input pulse as measured at any specified amplitude from the peak of the input pulse. The pulse width can be defined at the 50 percent amplitude point (half-amplitude) or the 70.7 percent amplitude point (−3 db point). This invention can detect the pulse width at any predetermined percentage level of the peak amplitude. This invention processes the output pulse whose width is equal to the pulse width of the pulse applied to the logarithmic amplifier. The heterodyne receivers which will use this invention are used to gather electronic intelligence or measure electromagnetic interference due to RF pulse signals.

SUMMARY OF THE INVENTION

This invention utilizes the following characteristic of the ideal logarithmic amplifier. The output of an ideal logarithmic amplifier is given by $$E_o = K\log_{10}E_i$$

where $E_i$ is the input voltage with reference to some convenient level, $\log_{10}$ is the logarithmic function to the base 10 and $K$ is a constant of proportionality. If the output voltage $E_o$ corresponds to the peak value of the input pulse $E_p$ then the output voltage at any level of the input pulse is given by $$E_b = K\log_{10}bE_p$$

where $b$ is the ratio of the desired amplitude level of the pulse to the peak level. The difference between the output voltage of the logarithmic amplifier which corresponds to the peak value of the input and the output voltage which corresponds to a predetermined percentage of the peak value of the input pulse is given by $$E_o - E_b = -K\log b_p$$

which is independent of the peak value of the input pulse.

The time difference between the leading edge and trailing edge of the input waveform at a predetermined percentage level $b$ of the peak voltage of the input pulse is equal to the time difference between the leading and trailing edge of the output waveform of the logarithmic amplifier which is $E_b$ volts below the peak of the output pulse $E_o$.

DETAILED DESCRIPTION OF THE PREFERRED EMBODIMENT

The single FIGURE is a block diagram of the pulse width detector circuit employing the principles of the invention. The detected pulse from the logarithmic amplifier is applied to the pulse width detector circuit at terminal 10. The pulse signal at terminal 10 is simultaneously applied through conductor 11 to comparator 12 and through conductor 16 to delay line 17. The input pulse to comparator 12 is compared to the predetermined reference voltage 14 which is applied to comparator 12 through conductor 13. If the input pulse amplitude on conductor 11 does not exceed reference voltage 14, the input pulse is not processed by the pulse width detector circuit. If the input pulse amplitude on conductor 11 exceeds the reference voltage 14, comparator 12 generates a voltage which is applied to monostable multivibrator 37 through conductor 15. The step voltage on conductor 15 causes monostable multivibrator 37 to change from the stable state to the unstable state. The output of monostable multivibrator 37 at terminal 38 is applied to peak sample and hold (PSH) circuit 26 through conductor 40 and to AND circuit 41 through conductor 39. The output of monostable multivibrator 37 is used to reset PSH circuit 26 and AND circuit 41 to process the input pulse.

The time delay $T_1$ of delay line 17 prevents the input pulse at terminal 10 from being processed until monostable multivibrator 37 resets AND circuit 41 and PSH circuit 26. The delayed pulse output of delay line 17 is applied through conductor 21 to delay line 22. The pulse is also applied through conductor 20 to capacitor C1 to the voltage divider at terminal 23 which consists of bias voltage 24 resistors R1, R2, R3. The voltage divider is adjusted so that the pulse which is applied through conductor 25 to PSH circuit 26 is clamped at a level which corresponds to the predetermined percentage of the peak amplitude level at the input to the logarithmic amplifier. This level is predetermined from the slope characteristic of the logarithmic amplifier which is specified in millivolts of output signal per db change of input signal. The PSH circuit 26 samples and holds the peak level of the clamped pulse applied on conductor 25.

The output of PSH circuit 26 is applied through conductor 27 to resistor R4, diode D1 to terminal 28 and through conductor 30 to comparator 32. With no output from PSH circuit 26 a small positive voltage is applied from bias voltage 29 through voltage divider R6 and R7 and diode D2 to terminal 28. The small positive voltage at terminal 28 is applied through conductor 30 to comparator 32. The small positive voltage applied to comparator 32 with no voltage output from PSH circuit 26 is to prevent noise voltages from triggering comparator 32.

The pulse applied through conductor 31 to comparator 32 is a delayed replica of the pulse applied through conductor 21 to delay line 22. The delay time T2 of delay line 22 is greater than the longest rise time and less than a time equal to the minimum pulse width of the expected input pulses. Amplification may be needed at the output of delay line 22 to insure that the amplitude of the pulse applied through conductor 31 to comparator 32 is equal to the amplitude of the pulse applied through conductor 20 to capacitor C1. When the delayed input pulse which is applied through conductor 31 arrives at comparator 32, comparator 32 will generate a positive voltage when the input pulse is equal to or greater than the voltage on conductor 30. The positive step voltage is applied through conductor 33 to flip-flop 34 and causes flip-flop 34 to change state and generate a positive step voltage on conductor 35. When the trailing edge of the pulse applied through conductor 31 to comparator 32 falls below the voltage on conductor 30, the output voltage of comparator 32 applied on conductor 33 becomes zero and will cause flip-flop 34 to change state and generate a negative step voltage on conductor 35. The signal voltage on conductor 35 is a rectangular pulse whose pulse width is equal to the pulse width of the signal which is applied to the logarithmic amplifier.

The signal on conductor 35 is applied to AND circuit 41. The signal applied to the AND circuit 41 through conductor 35 will appear on conductor 42 if the positive voltage from monostable multivibrator 37 which is applied to AND circuit 41 on conductor 39 is also present. The output of AND circuit 41 which appears at terminal 44 is also applied through conductor 43 to monostable multivibrator 37. The negative step portion of the voltage on conductor 43 is used to drive monostable multivibrator 37 back to the stable state and resets the pulse width detector circuit for the next input pulse. The monostable multivibrator 37 is designed to stay in the unstable state for a period of time that is much greater than the sum of the delay times of delay line 17 and delay line 22 plus a time equal to the widest pulse expected. The signal on conductor 43 is applied to the unstable stage of monostable multivibrator 37 in the following manner. The positive step voltage of the signal on conductor 43 does not affect the unstable stage since this stage is conducting. The negative step voltage of the signal on conductor 43 drives the unstable stage to cut-off prematurely and forces the multivibrator 37 to change to the stable state. The change of states of multivibrator 37 resets the pulse width detector for the next input pulse.

What is claimed is:

1. A pulse width detector circuit receiving simultaneously as an input pulse the detected output pulse from a logarithmic amplifier and a predetermined reference voltage comprising a first comparator receiving said input pulse and said reference voltage, said first comparator generating a step voltage only when the amplitude of said input pulse exceeds said reference voltage, a monostable multivibrator changing from the stable state to the unstable state upon receiving said step voltage, a peak sample and hold circuit, an AND circuit, the output pulse from said monostable multivibrator being used to reset said peak sample and hold circuit and said AND circuit to process said input pulse, first delay means also receiving said input pulse operating to prevent said input pulse from being processed until said monostable multivibrator resets said peak sample and hold circuit and said AND circuit, second delay means receiving a first predetermined delayed signal from said first delay means to provide a second predetermined delayed signal, voltage divider means, bias voltage means connected to said voltage divider, said voltage divider being adjusted so that said first predetermined delayed signal applied to said peak sample and hold circuit is clamped at a level corresponding to the predetermined percentage of the peak amplitude level at the input to said logarithmic amplifier, said peak sample and hold circuit holding the peak level of the clamped pulse, a second comparator receiving the output signal from said peak sample and hold circuit, said second comparator also receiving a second predetermined delayed signal, said second comparator generating a first positive step voltage only when said second predetermined delayed signal is equal to or greater than said output signal from said peak sample and hold circuit, flip-flop means receiving said positive step voltage changing the state thereof and generating a second positive step voltage, when the trailing edge of said second delayed signal falls below the voltage of said output signal from said peak sample and hold circuit the output voltage from said second comparator becomes zero causing said flip-flop means to change state thus generating a negative step voltage, the signal from said flip-flop means being a rectangular pulse whose width is equal to pulse width of the signal applied to said logarithmic amplifier, said rectangular pulse appearing at the output of said AND circuit when said first positive step voltage appears at the input thereof.

2. A pulse width detector circuit as defined in claim 1 further including means to apply the output signal from said AND circuit to said monostable multivibrator so that the negative portion drives said monostable multivibrator back to a stable state and thus resets said pulse width detector circuit.

3. A pulse width detector circuit as described in claim 2 further including bias voltage means to apply a small positive voltage to said second comparator to prevent noise voltages from a triggering action in the absence of an output signal from said peak sample and hold circuit.

* * * * *